(12) United States Patent
Li et al.

(10) Patent No.: US 12,440,993 B2
(45) Date of Patent: Oct. 14, 2025

(54) DUAL-ARM ROBOT ASSEMBLING SYSTEM

(71) Applicant: DELTA ELECTRONICS, INC., Taoyuan (TW)

(72) Inventors: Meng-Zong Li, Taoyuan (TW); Han-Ching Lin, Taoyuan (TW); Shi-Yu Wang, Taoyuan (TW); Po-Chiao Huang, Taoyuan (TW); Cheng-Hao Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 335 days.

(21) Appl. No.: 17/739,060

(22) Filed: May 6, 2022

(65) Prior Publication Data
US 2022/0362935 A1 Nov. 17, 2022

Related U.S. Application Data

(60) Provisional application No. 63/188,926, filed on May 14, 2021.

(30) Foreign Application Priority Data

Mar. 17, 2022 (CN) .......................... 202210266215.2

(51) Int. Cl.
*B25J 9/16* (2006.01)
*B25J 9/00* (2006.01)

(52) U.S. Cl.
CPC ........... *B25J 9/1682* (2013.01); *B25J 9/0081* (2013.01); *B25J 9/1605* (2013.01); *B25J 9/1666* (2013.01);
(Continued)

(58) Field of Classification Search
CPC ...... B25J 9/1682; B25J 9/0081; B25J 9/1605; B25J 9/1666; B25J 9/1669; B25J 9/1692; B25J 9/1697; B25J 9/1615
See application file for complete search history.

(56) References Cited

U.S. PATENT DOCUMENTS

2012/0010747 A1* 1/2012 Okazaki ............... G05B 19/423
901/46
2014/0163736 A1* 6/2014 Azizian ................. A61B 34/30
700/259
(Continued)

FOREIGN PATENT DOCUMENTS

| CN | 104002296 A | 8/2014 |
| CN | 107107342 A | 8/2017 |

(Continued)

OTHER PUBLICATIONS

Office Action dated Feb. 28, 2023 of the corresponding Japan patent application No. 2022-069367.
(Continued)

*Primary Examiner* — Mohamad O El Sayah
(74) *Attorney, Agent, or Firm* — Chun-Ming Shih; HDLS IPR SERVICES (57) ABSTRACT

A dual-arm robot assembling system including a controlling unit, a GUI, a first robotic-arm, and a second robotic-arm is disclosed. The GUI provides a graphic program editing page, which provides multiple instruction blocks used for editing a graphical program executed by the assembling system. At least one of the first robotic arm and the second robotic arm is disposed with a point-teaching tool thereon. Before the controlling unit controls the two robotic arms to perform an assembling operation based on the graphical program, a manager may directly drag the two robotic arms through the point-teaching tool, so as to implement a point-teaching procedure for the two robotic arms. Therefore, the assembling system may accomplish the assembling operation through the two robotic arms with cooperative movement.

13 Claims, 9 Drawing Sheets

(52) U.S. Cl.
CPC ........... *B25J 9/1669* (2013.01); *B25J 9/1692* (2013.01); *B25J 9/1697* (2013.01); *B25J 9/1615* (2013.01)

(56) References Cited

U.S. PATENT DOCUMENTS

| | | |
|---|---|---|
| 2014/0236565 A1 | 8/2014 | Kuwahara |
| 2014/0347079 A1* | 11/2014 | Min ................. G01R 31/001 324/750.01 |
| 2017/0182662 A1* | 6/2017 | Huang ................ B25J 19/026 |
| 2017/0336776 A1* | 11/2017 | Watanabe ............ G05B 19/409 |
| 2017/0343998 A1 | 11/2017 | Takayama et al. |
| 2019/0168385 A1* | 6/2019 | Du ........................ B25J 9/1638 |
| 2019/0291277 A1* | 9/2019 | Oleynik ................ B25J 9/1669 |
| 2019/0366544 A1* | 12/2019 | Oka ...................... B25J 9/1666 |
| 2020/0360100 A1* | 11/2020 | Mantri .................. A61B 90/50 |
| 2021/0060772 A1 | 3/2021 | Inaba |
| 2021/0162584 A1* | 6/2021 | Shao .................... G01B 5/0021 |
| 2021/0245364 A1* | 8/2021 | Westberg ............. B25J 9/1664 |
| 2021/0260750 A1* | 8/2021 | Beard, III ............. B25J 9/0081 |
| 2021/0316458 A1* | 10/2021 | Kang .................... B25J 9/1689 |
| 2022/0355483 A1* | 11/2022 | Lee ....................... B25J 9/1666 |
| 2022/0388179 A1* | 12/2022 | Yamazaki ............. B25J 9/1666 |
| 2023/0278211 A1* | 9/2023 | Koyama ............... B25J 9/0081 700/264 |

FOREIGN PATENT DOCUMENTS

| | | |
|---|---|---|
| CN | 109822579 A | 5/2019 |
| JP | 08216074 A | 8/1996 |
| JP | 2016198839 A | 12/2016 |
| JP | 6343353 B2 | 6/2018 |
| JP | 2019136848 A | 8/2019 |
| JP | 2021030397 A | 3/2021 |
| TW | 202006487 A | 2/2020 |
| TW | I724977 B | 4/2021 |

OTHER PUBLICATIONS

Office Action dated Sep. 21, 2022 of the corresponding Taiwan patent application No. 111109784.

* cited by examiner

DUAL-ARM ROBOT ASSEMBLING SYSTEM

CROSS-REFERENCE TO RELATED APPLICATION

This patent application claims the benefit of U.S. Provisional Patent Application No. 63/188,926, filed May 14, 2021, which is incorporated by reference herein.

BACKGROUND OF THE DISCLOSURE

Technical Field

The disclosure is related to an assembling system accomplished by using a robot, particularly related to a dual-arm robot assembling system.

Description of Related Art

The related-art production lines are mainly using single robotic arm combining the fixed jig on the production line to implement automated assembling operation.

As described above, when the production line needs changeover (that is, changing the product assembled by the production line), the fixed jig screwed on the plane needs to be disassembled in advance to change to the jig used for the assembling the next product. As a result, the changeover time for the production line may be seriously delayed, and the requirement of small-volume-large-variety for the production line may not be fulfilled.

On the other hand, after the production line is changed over, apart from changing the fixed jig according to the product to be assembled, the control program executed when the system controls the robotic arm also needs to be re-edited. However, some managers of the production line do not have program editing ability, and thus difficult to operate and manage that kind of production line.

Further, most of the production lines are using control button to perform point-teaching to the robotic arm, or perform point-teaching after the servomotor of the robotic arm is turned off (servo off). Thus, the teaching for the robotic arm is laborious and nonintuitive.

Therefore, the market needs a new type of assembling system, which may satisfy the requirement such as rapid changeover, easy programming, and convenient operation for the production line under the condition of using the robotic arm to implement automated production and assembly.

In view of this, the inventors have devoted themselves to the aforementioned related art, researched intensively try to solve the aforementioned problems.

SUMMARY OF THE DISCLOSURE

The main purpose of the disclosure is to provide a dual-arm robot assembling system, which may achieve the purpose of rapid changeover, easy programming, and convenient operation by using at least two robotic arms and a graphic user interface.

In order to achieve the purpose, the dual-arm robot assembling system of the disclosure includes:

a controlling unit;

a first robotic arm, communicatively connected with the controlling unit, and comprising a first tool disposed on one end thereof;

a second robotic arm, communicatively connected with the controlling unit, and comprising a second tool disposed on one end thereof; and a graphic user interface, communicatively connected with the controlling unit and configured to provide a graphic program editing page, the graphic program editing page providing multiple instruction blocks, the instruction blocks configured to edit a graphic program executed when the controlling unit controls the first robotic arm and the second robotic arm to perform an assembling operation, wherein the instruction blocks are respectively corresponding to different control instructions and handshaking data used for controlling the first robotic arm and the second robotic arm, wherein a point-teaching tool is disposed on at least one of the first robotic arm and the second robotic arm, and the point-teaching tool is configured to accept operation from external force to drag the first robotic arm or the second robotic arm to move and directly perform a point-teaching procedure.

The disclosure uses at least two robotic arms to replace the fixed jig in the related-art production line to fulfill the requirement of rapid changeover in the production line. Further, the disclosure provides the instruction blocks through the graphic user interface for the user to edit graphic program to implement the purpose of easy programming. Moreover, the disclosure provides the point-teaching tool on the robotic arm to allow the user to directly drag the robotic arm for point-teaching, thereby achieving the technical feature of convenient operation.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

The disclosure discloses a dual-arm robot assembling system applied on the production line, which uses at least two robotic arms to execute the assembling operation to reduce the changeover time of the production line and further achieve the production and assembly requirement of small-volume-large-variety for the present production line. The robotic arm may be, but not limited to, the six-axis robotic arm, or selective compliance assembly robot arm (SCARA), or the other types of robotic arms.

Figure 1:
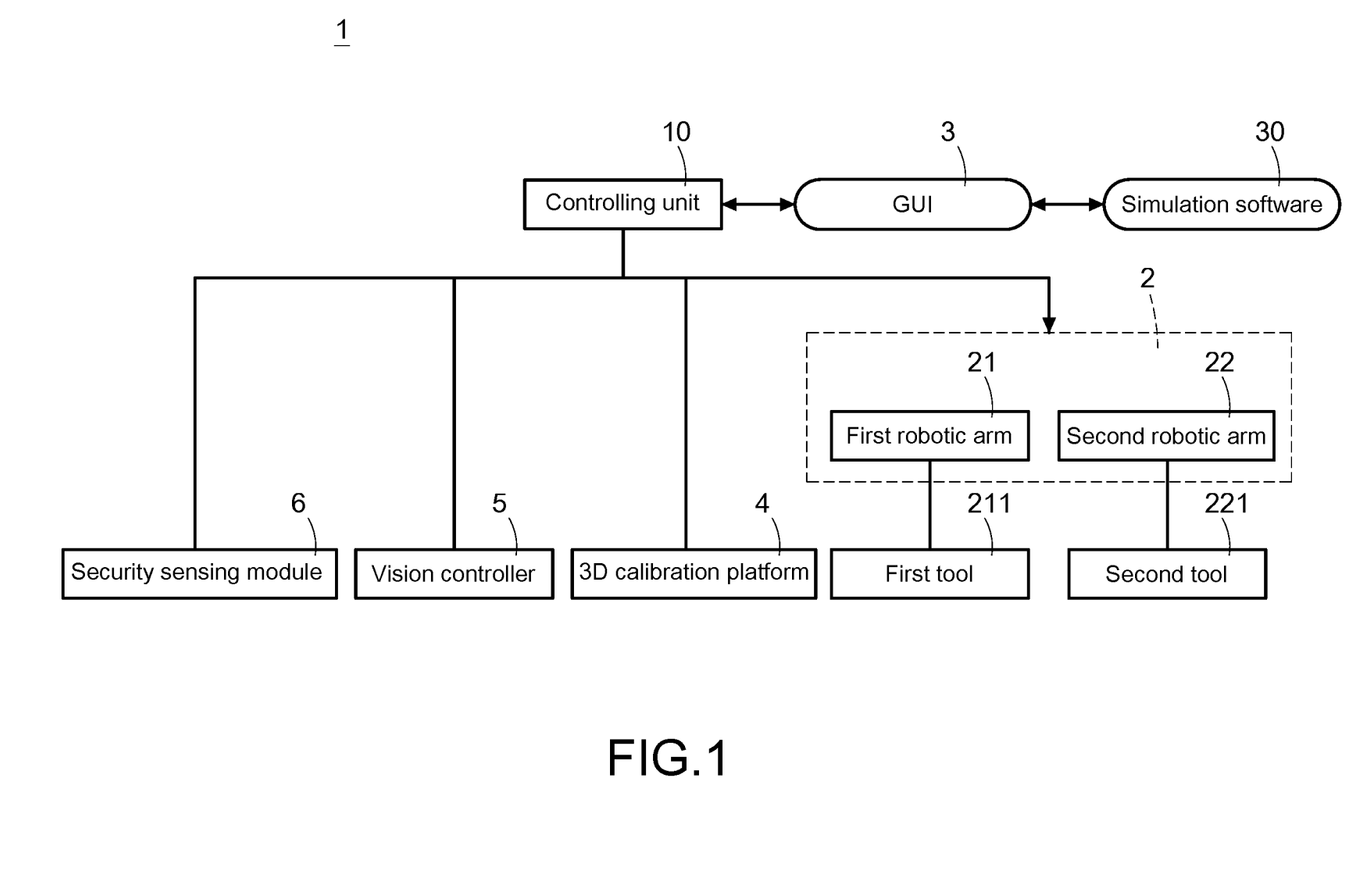
FIG. 1 is a block diagram of the system of the disclosure in accordance with some embodiments.
Figure 2:
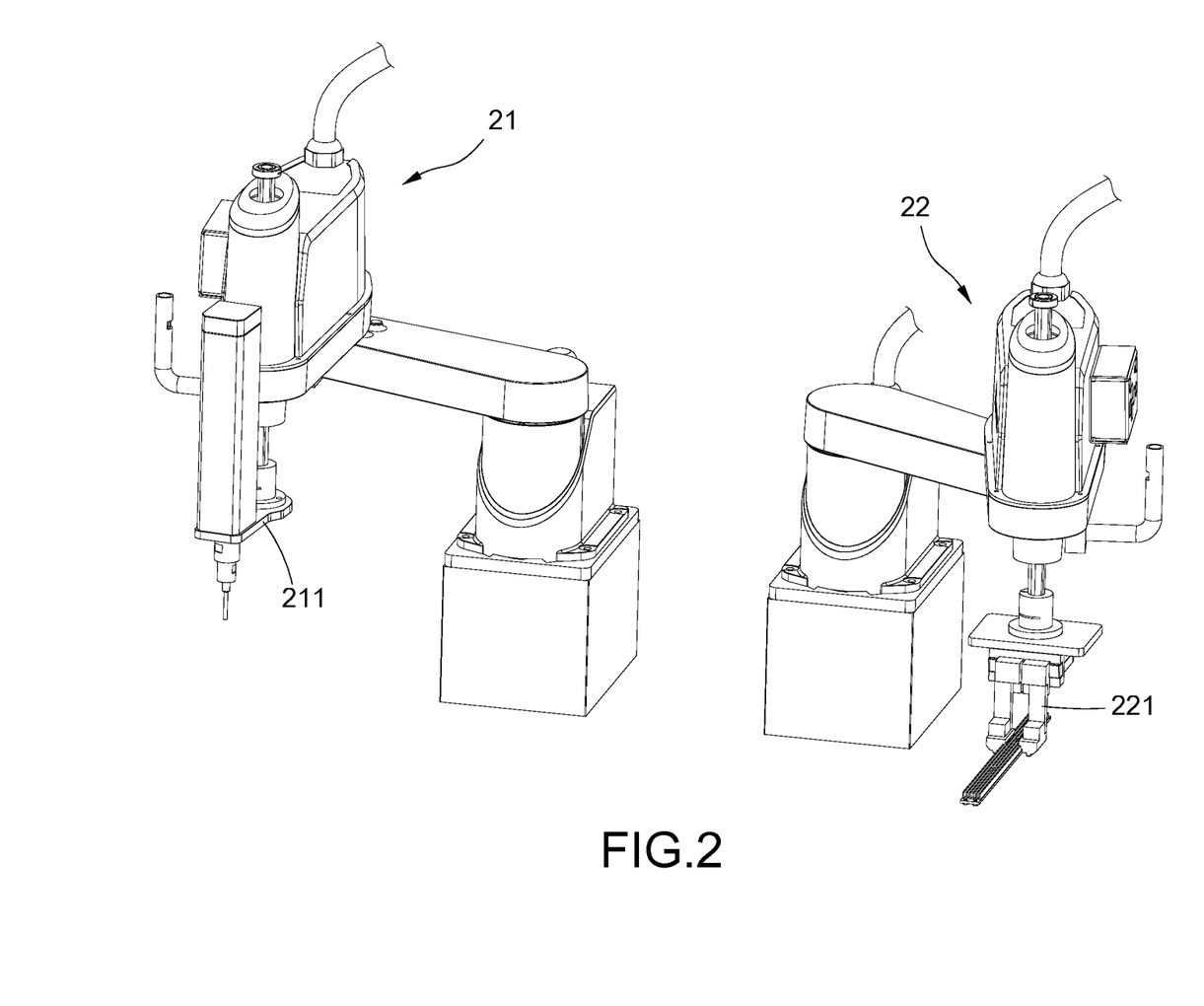
FIG. 2 is a schematic diagram of the system of the disclosure in accordance with some embodiments.

Please refer to FIG. 1 and FIG. 2, FIG. 1 is a block diagram of the system of the disclosure in accordance with some embodiments. FIG. 2 is a schematic diagram of the system of the disclosure in accordance with some embodiments.

FIG. 1 discloses the dual-arm robot assembling system (abbreviated as the assembling system 1 hereafter in the specification) of the disclosure. As shown in FIG. 1, the assembling system 1 at least includes a controlling unit 10, a robot 2 and a graphic user interface (GUI) 3 both communicatively connected with the controlling unit 10. In the disclosure, the controlling unit 10 may be, for example, the electronic device with processor, such as the industrial personal computer (IPC), server, personal computer, laptop, or tablet computer, etc., here is not intended to be limiting.

In some embodiments, the robot 2 and the GUI 3 are communicatively connected with the controlling unit 10 through a wired manner (for example, cable or network cable, etc.) or a wireless manner (for example, Wi-Fi or ethernet, etc.), respectively. In some other embodiments, the GUI 3 is built in the controlling unit 10 and directly provided by the controlling unit 10, here is not intended to be limiting.

As shown in FIG. 1 and FIG. 2, the robot 2 may include a first robotic arm 21 and a second robotic arm 22. The first robotic arm 21 may represent left hand and the second robotic arm 22 may represent right hand. Specifically, the embodiment in FIG. 1 uses two robotic arms as an example, but the assembling system 1 of the disclosure is not limited to two robotic arms. For better understanding, the first robotic arm 21 and the second robotic arm 22 are used as an example in the following description, here is not intended to be limiting.

A first tool 211 is disposed on one end of the first robotic arm 21 and a second tool 221 is disposed on one end of the second robotic arm 22. Specifically, the first robotic arm 21 and the second robotic arm 22 respectively have a flange. The first tool 211 and the second tool 221 are respectively disposed on the flanges of the first robotic arm 21 and the second robotic arm 22. The detail of the flange is omitted here for brevity.

In some embodiments, the first tool 211 and the second tool 221 may be the same tools, for example, electric gripper, electric screwdriver, welding gun, etc., here is not intended to be limiting. In some other embodiments, the first tool 211 and the second tool 221 may be different tools, for example, the first tool 211 may be the assembling tool and the second tool 221 may be the gripping tool (or clamping tool).

In some embodiments, the assembling system 1 is configured to control the first robotic arm 21 and the first tool 211 to perform main assembling action. Further, the assembling system 1 is configured to use the second robotic arm 22 and the second tool 221 to replace the fixed jig used in the related-art production line. As a result, under the operating condition of using one auxiliary arm (that is, the second robotic arm 22) to assist one main arm (that is, the first robotic arm 21), the assembling operation may be rapidly and precisely completed. Further, the requirement of rapid changeover may be achieved by solely changing the first tool 211 and the second tool 221 without disassembling the fixed jig.

Specifically, when the production line needs to change the product of production/assembly, the manager of the production line only needs to change the first tool 211 and/or the second tool 221 and re-arrange the control program executed when the controlling unit 10 controls the first robotic arm 21 and the second robotic arm 22. The time of changing the tool on the robotic arm is much shorter than the time of disassembling the fixed jig screwed on the platform and re-screwing the fixed jig being changed in the related-art. Therefore, the disclosure may reduce the changeover time of the production line and further achieve the purpose of rapid changeover, and satisfy the production/assembly requirement of small-volume-large-variety for the production line.

The GUI 3 may be configured to provide the graphic program editing page. The manager of the production line may directly edit the graphic program executed when the assembling system 1 controls the first robotic arm 21 and the second robotic arm 22 to perform assembling operation through operating the graphic program editing page.

Specifically, the graphic program editing page of the disclosure may be configured to provide multiple instruction blocks. The instruction blocks are pre-created. Each instruction block is configured to record the control instruction and the handshaking data used to control the operation of the first robotic arm 21 or the second robotic arm 22. Even the manager does not have program coding ability, the manager may directly edit required graphic program through editing multiple instruction blocks in the graphic program editing page (described hereafter). As a result, the purpose of easy programming may be achieved.

Figure 7:
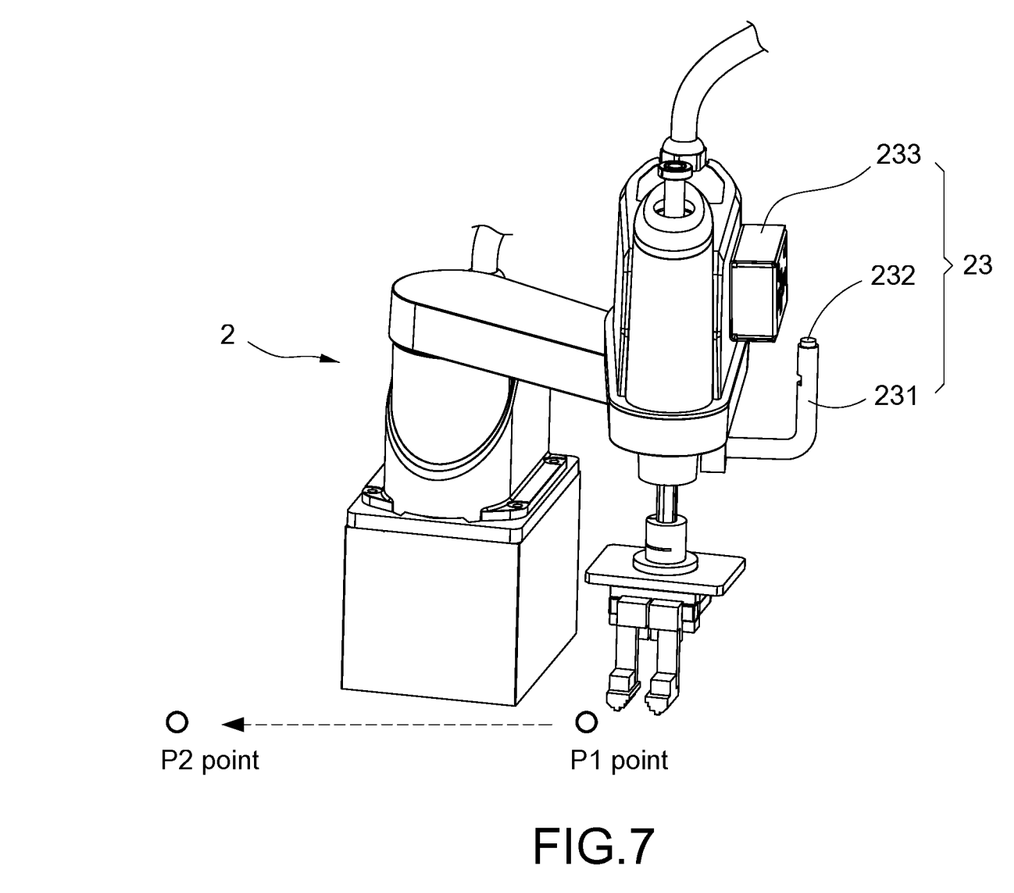
FIG. 7 is a schematic diagram of the hand-pulled point-teaching of the disclosure in accordance with some embodiments.

It is worth mentioning that the first robotic arm 21 or the second robotic arm 22 may be disposed with one or multiple point-teaching tools (for example, the point-teaching tool 23 shown in FIG. 7). Under condition of the servomotor is turned on (servo on), the manager of the production line may directly drag the first robotic arm 21 and/or the second robotic arm 22 in a hand-pulled manner by operating the point-teaching tool 23 to perform the point-teaching procedure to the robot 2. The manager may intuitively perform the point-teaching procedure with the auxiliary force of the robot 2 by the point-teaching tool 23 of the disclosure (described hereafter).

As shown in FIG. 1, the assembling system 1 may include a 3D calibration platform 4 communicatively connected with the controlling unit 10. In the disclosure, the 3D calibration platform 4 is used to calibrate and synchronize the coordinate position of the first robotic arm 21 and the second robotic arm 22. In some embodiments, the 3D calibration platform 4 may be implemented by optical isolation sensor.

When calibrating, the controlling unit 10 is configured to respectively control the first robotic arm 21 and the second robotic arm 22 to move and block light emitted from the 3D calibration platform 4. When the light is blocked, the 3D calibration platform 4 may record the present coordinate of the first robotic arm 21 and the second robotic arm 22, thereby positioning the first robotic arm 21 and the second robotic arm 22. After the first robotic arm 21 and the second robotic arm 22 are positioned, the 3D calibration platform 4 may calibrate and synchronize the positions of the first robotic arm 21 and the second robotic arm 22.

Specifically, the disclosure uses the 3D calibration platform 4 to calibrate the first robotic arm 21 and the second robotic arm 22 to make the first robotic arm 21 and the second robotic arm 22 understand the relative position of another robotic arm. As a result, the operation of the first robotic arm 21 and the second robotic arm 22 may be controlled more precisely.

Figure 3:
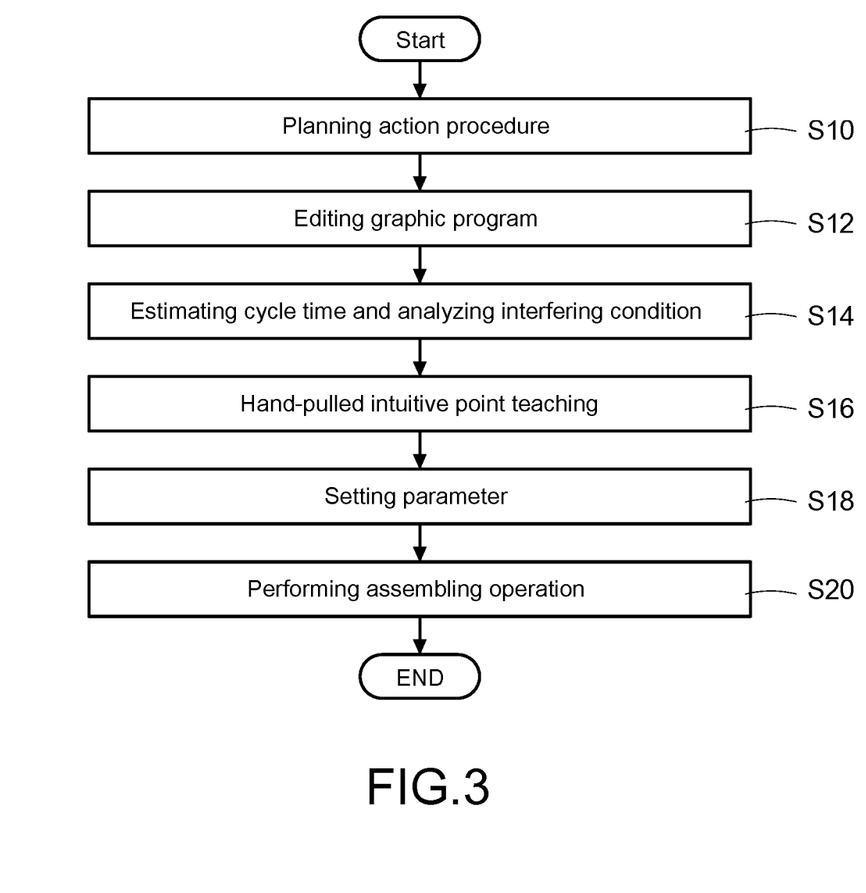
FIG. 3 is an operating flowchart of the system of the disclosure in accordance with some embodiments.

Please refer to FIG. 3, which is an operating flowchart of the system of the disclosure in accordance with some embodiments. For using the assembling system 1 of the disclosure, first, the manager of the production line plans a set of action procedure according to required assembling actions (step S10), and uses the GUI 3 to edit the graphic program in the graphic program editing page based on the planned action procedure (step S12).

The action procedure may include one or more actions executed by the first robotic arm 21 and the second robotic arm 22 during assembling process, and the information, such as position, gesture, etc., for executing the actions. After the action procedure is planned, the manager may operate the GUI 3 to use the instruction blocks in the graphic program editing page to edit the graphic program consistent with the action procedure. After the controlling unit 10 executes the graphic program, the controlling unit 10 may control the first robotic arm 21 and the second robotic arm 22 to implement the action procedure planned by the manager in the step S10, thereby completing the assembling operation.

As shown in FIG. 1, the controlling unit 10 of the disclosure may be configured to further execute the simulation software 30. In the disclosure, the simulation software is used to simulate the result of the first robotic arm 21 and the second robotic arm 22 executing the action procedure.

As shown in FIG. 3, after the edition of the graphic program is completed and before the graphic program is practically executed by the controlling unit 10, the simulation software 30 may be used to simulate the execution of the graphic program based on the present set value of the first robotic arm 21 and the second robotic arm 22. The controlling unit 10 may be configured to estimate and record required cycle time for executing the graphic program according to the simulation result of the simulation software 30, and analyze and record possible interfering condition of the first robotic arm 21 and the second robotic arm 22 during the assembling operation (step S14).

In summary, if the cycle time from the simulation result does not satisfy the requirement (such as, the time is longer than desirable value), or the first robotic arm 21 and the second robotic arm 22 may collide with each other, the manager may re-plan the action procedure or re-edit the graphic program.

As described above, the action procedure planned by the manager in the step S10 includes the position and gesture of the first robotic arm 21 and the second robotic arm 22 when executing each action. Before the controlling unit 10 practically executes the graphic program, the manager may perform the hand-pulled intuitive point-teaching to the first robotic arm 21 and/or the second robotic arm 22 through the point-teaching tool 23 (step S16) to make the first robotic arm 21 and the second robotic arm 22 learn the correct position and correct gesture of each action. As a result, the assembling precision is increased, the cycle time is reduced, and the interference problem is solved.

Further, the manager may set the parameters of the first robotic arm 21 and the second robotic arm 22 (step S18). For example, if the first robotic arm 21 or the second robotic arm 22 is electric screwdriver, the manager may set all kinds of required parameters (such as RPM, screwing time, screwing force, etc.) of the electric screwdriver in the step S18.

When the step S10 to the step S18 are all executed, the manager may make the controlling unit 10 to practically execute the graphic program. When the controlling unit 10 practically executes the graphic program, the controlling unit 10 may control the first robotic arm 21 (and the first tool 211) and the second robotic arm 22 (and the second tool 221) based on content of the graphic program to implement the assembling operation on the production line through the first robotic arm 21 and the second robotic arm 22 (step S20).

As shown in FIG. 1, the assembling system 1 may further include a vision controller 5 communicatively connected with the controlling unit 10. In the disclosure, the controlling unit 10 may be configured to control the vision controller 5 to capture the image at required position during assembling process, and execute the image recognition procedure to the image to obtain required information. As a result, the quality of the assembling operation may be further ensured.

In some embodiments, the action procedure planned by the manager may include actions of the first robotic arm 21, the second robotic arm 22 and vision controller 5. For example, the action procedure may be shown as below:

| Sequence | First robotic arm 21 | Second robotic arm 22 | Vision controller 5 |
|---|---|---|---|
| 1 | | Executing visual positioning | Determining the screwing positions of P1 point and P2 point |
| 2 | Absorbing screw | Synchronously moving to P1 point's side and softly pressing the workpiece | |
| 3 | Screwing P1 point | | |
| 4 | Absorbing screw | Synchronously moving to P2 point's side and softly pressing the workpiece | |
| 5 | Screwing P2 point | | |
| 6 | . . . | . . . | . . . |

As shown in the above table, the manager may plan the action procedure of the first robotic arm 21, the second robotic arm 22 and vision controller 5 simultaneously according to required sequence of the assembling operation. In some embodiments, the instruction blocks provided by the graphic program editing page also include one or multiple instruction blocks corresponding to the instruction of the vision controller 5 executing the image capturing action. As a result, if the manager edits the graphic program according to the planned action procedure, the controlling unit 10 may be configured to simultaneously control the first robotic arm 21, the second robotic arm 22 and vision controller 5, when executing the graphic program, to implement the assembling operation.

In some embodiments, the vision controller 5 includes at least one camera, here is not intended to be limiting.

Figure 4:
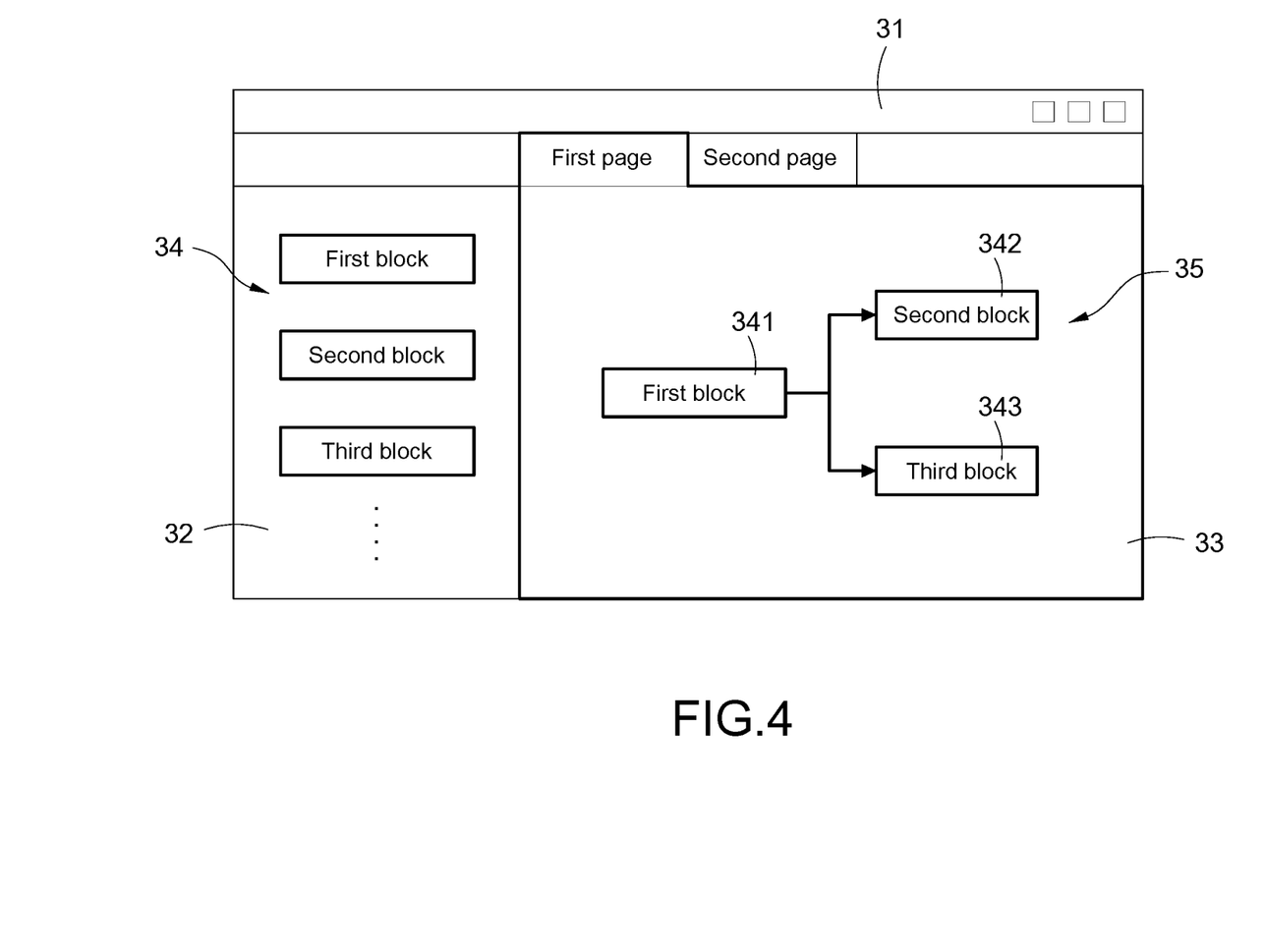
FIG. 4 is a schematic diagram of the graphic program editing page of the disclosure in accordance with some embodiments.

Please refer to FIG. 4, which is a schematic diagram of the graphic program editing page of the disclosure in accordance with some embodiments. The assembling system 1 of the disclosure may provide the graphic program editing page 31 through the GUI 3. As shown in FIG. 4, the graphic program editing page 31 includes an action instruction area 32 and a program editing area 33.

The action instruction area 32 is used to provide multiple instruction blocks 34, which are pre-created. In the embodiment of FIG. 4, the instruction blocks 34 uses a first block 341, a second block 342 and a third block 343 as an example, here is not intended to be limiting.

Each instruction block 34 is configured to record the instruction and corresponding position used for controlling the first robotic arm 21, the second robotic arm 22 and vision controller 5. For example, each instruction block 34 may be corresponding to the instruction, such as "the first robotic arm moves to the initialization point", "the second robotic arm moves to P1 point", "the first robotic arm descends", "the second robotic arm cylinder gripper opens", "the first robotic arm rotates 180°", "the vision controller recognizes image at P2 point", etc., here is not intended to be limiting.

The program editing area 33 is used for the manager to operate to edit the instruction blocks 34 to the required graphic program 35.

Specifically, the manager may search and select the instruction blocks 34 corresponding to required instructions from the action instruction area 32, and drag the instruction blocks 34 from the action instruction area 32 to the program editing area 33. Further, the manager may edit the serial relationship or parallel relationship between the instruction blocks 34 in the program editing area 33 referring to the planned action procedure, and generate required graphic program 35 according to the instruction blocks 34 in the program editing area 33.

As shown in FIG. 4, the program editing area 33 may be configured to provide multiple pages (for example, first page, second page, etc.), the manager may edit different graphic program 5 in different pages. When the production line is changed over, the controlling unit 10 may be configured to obtain corresponding graphic program 35 to control the first robotic arm 21, the second robotic arm 22 and vision controller 5 to perform the assembling operation after changeover. Therefore, the purpose of rapid changeover of the disclosure may be achieved.

Figure 5:
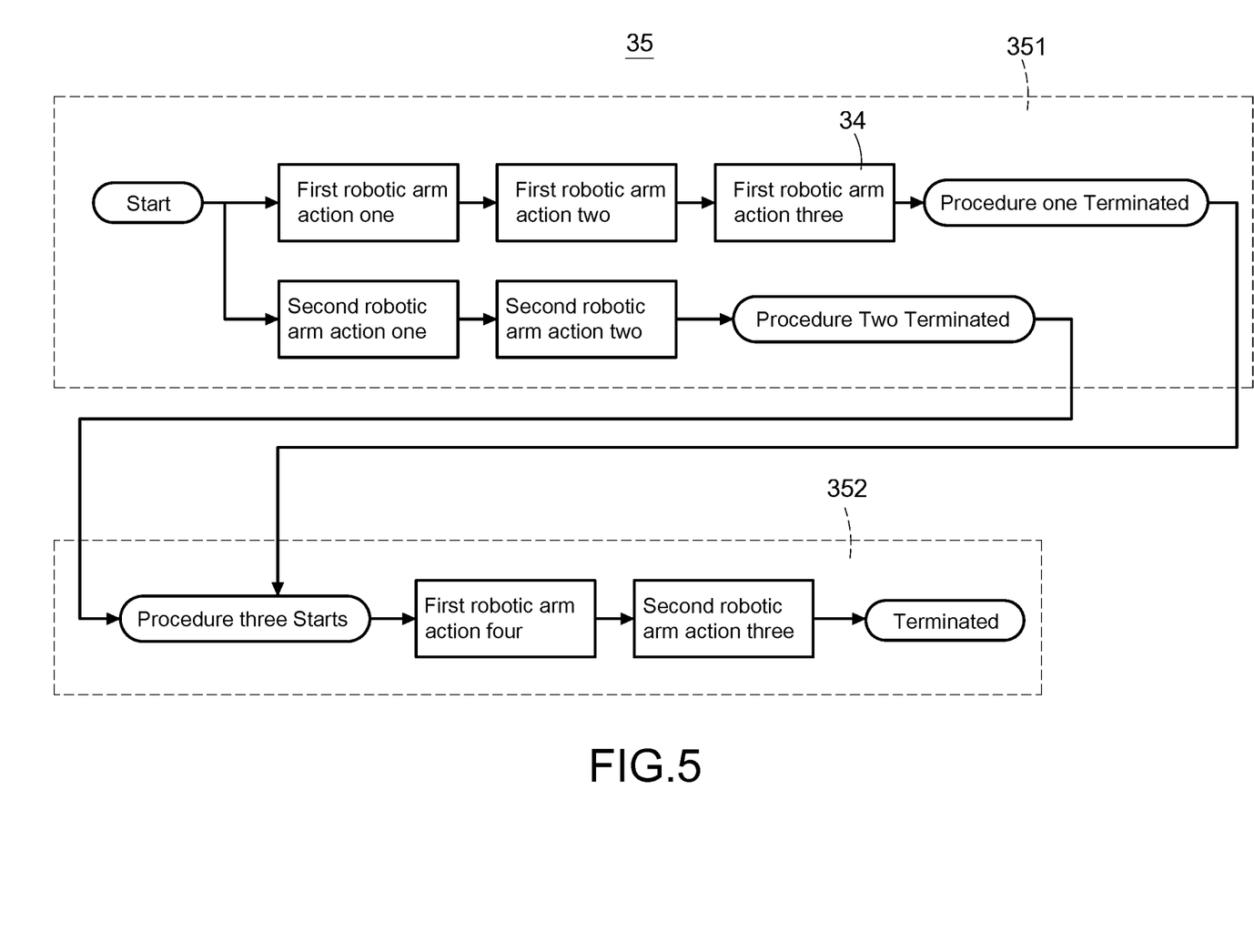
FIG. 5 is a schematic diagram of the graphic program of the disclosure in accordance with some embodiments.

Please refer to FIG. 5, which is a schematic diagram of the graphic program of the disclosure in accordance with some embodiments. FIG. 5 is used to further describe the graphic program 35.

As shown in FIG. 5, the manager may connect three instruction blocks 34 corresponding to three instructions, such as "the first robotic arm executes action one", "the first robotic arm executes action two" and "the first robotic arm executes action three", to create procedure one. Further, the manager may connect two instruction blocks 34 corresponding to two instructions, such as "the second robotic arm executes action one" and "the second robotic arm executes action two", to create procedure two. Moreover, the manager may set the instruction blocks 34 in the procedure one and the instruction blocks 34 in the procedure two to be the parallel relationship 351. In other words, the controlling unit 10 may simultaneously control the first robotic arm 21 and the second robotic arm 22 to operate to simultaneously execute the procedure one and procedure two.

The manager may set the procedure three to be executed after execution of the procedure one and procedure two is completed. Further, the manager may connect two instruction blocks 34 corresponding to two instructions, such as "the first robotic arm executes action four" and "the second robotic arm executes action three", to create procedure three. In the embodiment of FIG. 5, the manager may set the instruction blocks 34 in the procedure three to be the serial relationship 352. In other words, when executing the procedure three, the controlling unit 10 is configured to control the first robotic arm 21 to execute action four, and then control the second robotic arm 22 to execute action three to complete the procedure three.

The instruction blocks 34 in the disclosure are mainly coded and stored in advance by the provider of the assembling system 1 based on the supportive program language. Each instruction block 34 is configured to record the data, such as the executable action of the robotic arm, the corresponding position of each action and the handshaking information between the robotic arms, etc. The manager, under the premise of lacking programming ability, may directly select the demands, such as the required action, the robotic arm of executing action, the executing position of the action, etc., by using the instruction blocks 34 to directly edit the graphic program 35.

Further, the instruction blocks 34 already includes the handshaking information between the robotic arms, and thus the manager only needs to select required instruction blocks 34 to edit the graphic program 35 and does not need to additionally compile the handshaking instruction. Moreover, as described above, after edition of the graphic program 35 is completed, the manager may simulate the execution through the simulation software 30 to determine whether the graphic program 35 satisfy the demand.

Figure 6:
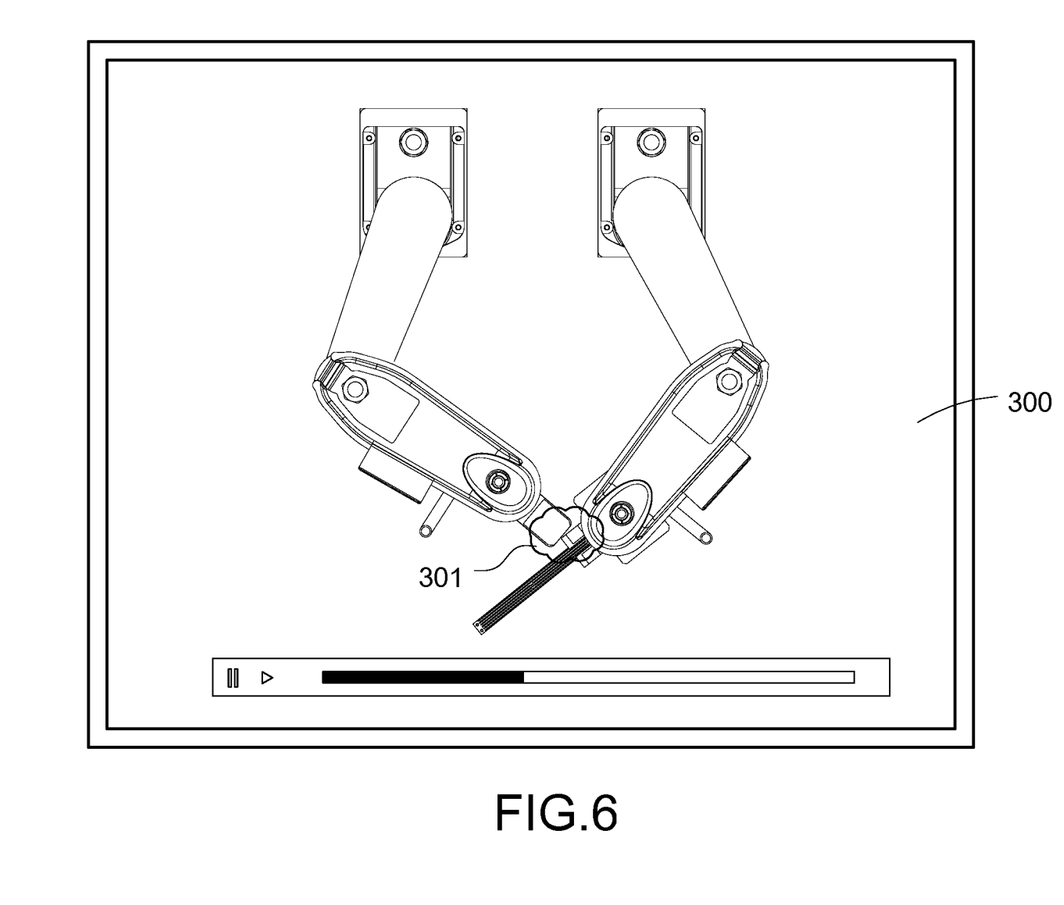
FIG. 6 is a schematic diagram of the program simulation of the disclosure in accordance with some embodiments.

Please refer to FIG. 6, which is a schematic diagram of the program simulation of the disclosure in accordance with some embodiments. When edition of the graphic program 35 is completed, the controlling unit 10 may be configured to execute the simulation software 30 in advance, and import the present set value of the components, such as the first robotic arm 21, the second robotic arm 22 and vision controller 5, etc., to the simulation software 30. Therefore, the simulation software 30 may be configured to simulate the execution of the graphic program 35 based on the present set value of the first robotic arm 21, the second robotic arm 22 and vision controller 5. In some embodiments, the present set value may be, for example, model number, initialization position, moving speed, etc., here is not intended to be limiting.

As shown in FIG. 6, the simulation software 30 may provide a simulation page 300 and display that on the display screen of the controlling unit 10. In some embodiments, the simulation software 30 is configured to generate the simulation image of the first robotic arm 21, the second robotic arm 22 and vision controller 5 based on the present set value, and display that on the simulation page 300. When the simulation software 30 simulates the execution of the graphic program 35, the simulation software 30 modify the simulation image correspondingly according to content of the graphic program 35, thereby displaying the simulation image of the first robotic arm 21, the second robotic arm 22 and vision controller 5 practically operating according to instruction of the graphic program 35 on the simulation page 300. The simulation image may be static picture or dynamic video, here is not intended to be limiting.

In some embodiments, the simulation software 30 is configured to simulate the execution of the graphic program 35 according to the present set value of the first robotic arm 21, the second robotic arm 22 and vision controller 5. The present set value includes the moving speed of the components. Therefore, the controlling unit 10 may be configured to analyze and record the cycle time of executing the graphic program 35 according to the result of simulating execution.

The manager may confirm whether the graphic program 35 used presently satisfies the demand (for example, whether the cycle time is longer than desirable time) through the simulating execution of the simulation software 30, and further determine whether to adjust the parameters (for example, moving speed) of the first robotic arm 21, the second robotic arm 22 and/or vision controller 5, re-edit the graphic program 35, or re-plan action procedure (for example, reduce assembling steps). Therefore, the edited graphic program 35 (and the planned action procedure) may be verified in advance through offline simulation.

Further, the present set value includes the information, such as model number, initialization position, moving speed, etc., of the first robotic arm 21, the second robotic arm 22 and/or vision controller 5. Therefore, the simulation software 30 may be configured to analyze whether the interfering condition occurs between the first robotic arm 21, the second robotic arm 22 and/or vision controller 5 during simulating the execution of the graphic program 35.

Specifically, the interfering condition indicates that whether the first robotic arm 21, the second robotic arm 22 and/or vision controller 5 collides with one another when performing the operations according to content of the graphic program 35. Further, as shown in FIG. 6, when simulation software 30 is configured to determine that the first robotic arm 21, the second robotic arm 22 and/or vision controller 5 interfere with one another at specific area (as interfering area 301 hereafter) on specific time during simulating execution, the simulation software 30 may label the interfering area 301. In some embodiments, the simulation software 30 may be configured to use different colors (such as red) to label the interfering area 301, and display the interfering area 301 on the display screen of the controlling unit 10 (for example, displaying on the simulation image in the simulation page 300).

With respect to analyzation and labelling of the interfering area 301, the manager may re-adjust the parameters of the first robotic arm 21, the second robotic arm 22 and/or vision controller 5, re-edit the graphic program, or re-plan the action procedure. Therefore, when the controlling unit 10 practically controls the first robotic arm 21, the second robotic arm 22 and vision controller 5 to perform the assembling operation, the problem of the first robotic arm 21, the second robotic arm 22 or vision controller 5 colliding to cause damage may be avoided.

As described above, the graphic program 35 of the disclosure is generated by the instruction blocks 34 in the parallel relationship 351 and/or serial relationship 352. Each instruction block 34 is configured to record the instruction of controlling the first robotic arm 21, the second robotic arm 22 or vision controller 5 to execute specific action, and further record the executing position of the action.

For example, the first instruction block may be corresponding to the instruction of "the first robotic arm 21 obtains material", and the second instruction block may be corresponding to the instruction of "the second robotic arm 22 moves to P1 point". In some embodiments, the manager may operate the point-teaching tool 23 on the first robotic arm 21 and the second robotic arm 22 to intuitively teach the first robotic arm 21 where the material-obtaining area is in a hand-pulled manner and teach the second robotic arm 22 where P1 point is.

Figure 8:
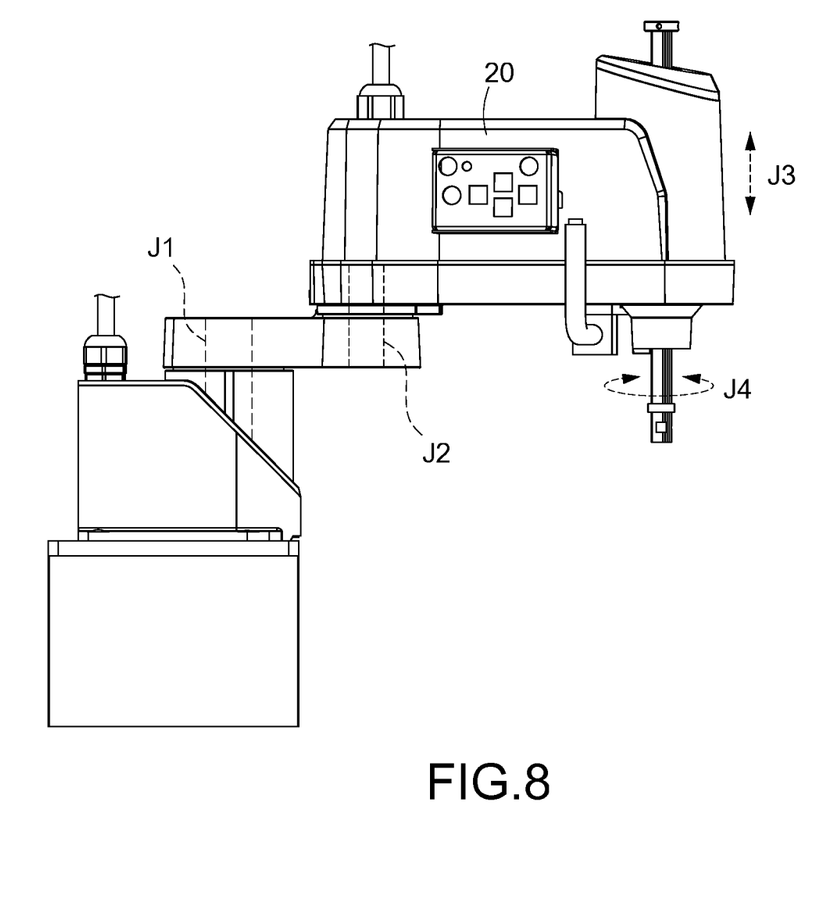
FIG. 8 is a schematic diagram of the robotic arm of the disclosure in accordance with some embodiments.

Please refer to FIG. 7 and FIG. 8, FIG. 7 is a schematic diagram of the hand-pulled point-teaching of the disclosure in accordance with some embodiments. FIG. 8 is a schematic diagram of the robotic arm of the disclosure in accordance with some embodiments. The robotic arm in FIG. 7 and FIG. 8 uses SCARA as an example to describe, here is not intended to be limiting. In some other embodiments, the six-axis robotic arm or the other types of robotic arm may be adopted. As shown in FIG. 7, the robot 2 of the disclosure is disposed with the point-teaching tool 23. In some embodiments, the point-teaching tool 23 may be disposed on the first robotic arm 21 or the second robotic arm 22. In some other embodiments, the first robotic arm 21 and the second robotic arm 22 may be disposed with the point-teaching tool 23, respectively.

The point-teaching tool 23 at least includes a handle 231 disposed on the first robotic arm 21 and/or the second robotic arm 22, and the handle 231 includes an initiating button 232 disposed thereon. The handle 231 is used for the manager to grasp, and the initiating button 232 is disposed on a location corresponding to thumb of the manager's hand.

When the manager grasps the handle 231 and presses the initiating button 232 by thumb, the manager may pull the handle 231 to drag the first robotic arm 21 or the second robotic arm 22 to move to change the position on X-axis and Y-axis in the plane space, and record the coordinate position after the first robotic arm 21 or the second robotic arm 22 being moved.

For example, the manager may directly drag the first robotic arm 21 to the location of the material-obtaining area through the handle 231, and record the coordinate of the first robotic arm 21 to be the location of the material-obtaining area to complete the point-teaching procedure of the first instruction block. When the controlling unit 10 is configured to control the first robotic arm 21 to execute material-obtaining action based on the graphic program 35, the first robotic arm 21 may precisely move to the material-obtaining area to obtain material.

For another example, the manager may directly drag the second robotic arm 22 to the location of P1 point through the handle 231, and record the coordinate of the second robotic arm 22 to be the location of the P1 point (P1 point may be, for example, the assembling position of one component) to complete the point-teaching procedure of the first instruction block. When the controlling unit 10 is configured to control the second robotic arm 22 to move based on the graphic program 35, the second robotic arm 22 may precisely move to the location of P1 point.

As shown in FIG. 7, the point-teaching tool 23 may further include a setting button 233 disposed on the first robotic arm 21 and/or the second robotic arm 22. When the manager drags the first robotic arm 21 or the second robotic arm 22 to move through the handle 231, the manager may operate the setting button 233 at the same time to finely control and adjust each pivot joint of the first robotic arm 21 and/or the second robotic arm 22.

As shown in FIG. 8, the robot 2 (that is, the first robotic arm 21 and the second robotic arm 22) may have a J1 axis, a J2 axis, a J3 axis and a J4 axis. The J1 axis and J2 axis are used to control the X-axis location and Y-axis location of the robot 2 in plane space, the J3 is used to control the Z-axis location of the robot 2 in 3D space, and the J4 axis (that is, RZ axis) is used to control rotation of the robot 2. In some embodiments, the manager may control the setting button 233 to adjust and record location of the J3 axis (that is, Z axis) and J4 axis (that is, RZ axis) of the first robotic arm 21 or the second robotic arm 22.

The detail of the J1 axis, J2 axis, J3 axis and J4 axis is omitted here for brevity.

It is worth mentioning that the arm on the J2 axis may be indicated as J2 arm 20. In some embodiments, the handle 231 and setting button 233 may be disposed on the J2 arm 20 of the first robotic arm 21 and/or the second robotic arm 22. It may make the manager drag the robotic arm in a laborsaving manner by disposing the point-teaching tool 23 on the J2 arm 20.

Specifically, the assembling system 1 of the disclosure may provide the manager to perform the point-teaching procedure to the first robotic arm 21 and/or the second robotic arm 22 in a hand-pulled manner under servo on state through the arrangement of the point-teaching tool 23. When performing the point-teaching, the manager may intuitively drag/pull the first robotic arm 21 and the second robotic arm 22 and the robotic arm may provide auxiliary force during dragging/pulling, and thus the threshold of operation and teaching may be effectively decreased.

As shown in FIG. 1, the assembling system 1 may further include a security sensing module 6 communicatively connected with the controlling unit 10. By the arrangement of the security sensing module 6, when the controlling unit 10 controls the first robotic 21 and the second robotic arm 22 to execute the assembling operation, the controlling unit 10 may prevent the first robotic arm 21 and/or the second robotic arm 22 from colliding external object, thereby ensuring safety of the assembling operation.

Figure 9:
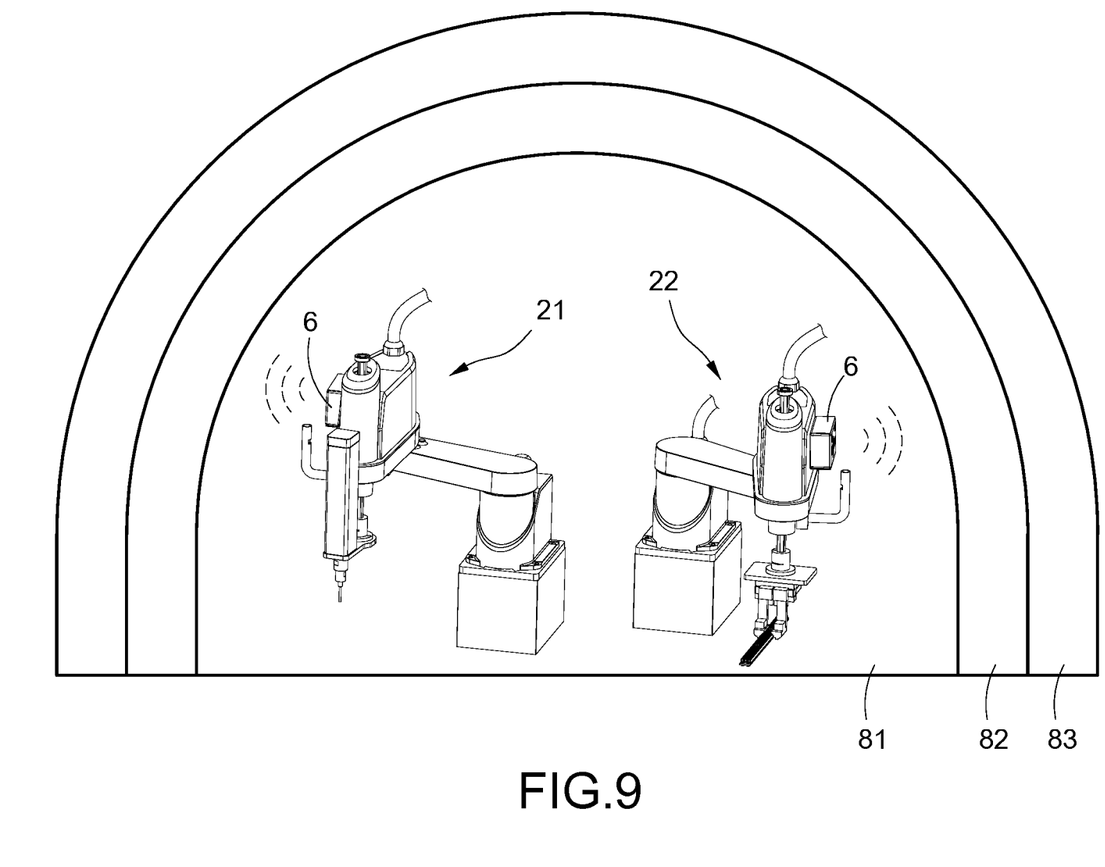
FIG. 9 is a schematic diagram of the security detection of the disclosure in accordance with some embodiments.

Please refer to FIG. 9, which is a schematic diagram of the security detection of the disclosure in accordance with some embodiments. As shown in FIG. 9, the first robotic arm 21 and the second robotic arm 22 may be respectively disposed with the security sensing module 6. In some embodiments, the security sensing module 6 may be disposed on the J2 arm 20, here is not intended to be limiting.

In some embodiments, the security sensing module 6 may include a 3D stereopsis sensor, optical sensor, supersonic sensor, or the sensor capable of sensing object, etc., to sense the approaching of object 9 within a specific distance, here is not intended to be limiting.

In some embodiments, when the controlling unit 10 is configured to control the first robotic arm 21 and the second robotic arm 22 to execute the assembling operation, the controlling unit 10 may sense whether any object 9 is approaching on periphery through the security sensing module 6. Specifically, the security sensing module 6 may be configured to, for example, emit light or light wave externally, determine whether any object 9 is approaching by the reflective light or reflective wave, and compute the distance between the object 9 and the first robotic arm 21 and/or the distance between the object 9 and the second robotic arm 22. In some other embodiments, the security sensing module 6 may be configured to, for example, determine whether any object 9 is approaching within a specific range in a visual detection manner.

In some embodiments, when the security sensing module 6 senses approaching of the object 9, the controlling unit 10 may be configured to control the first robotic arm 21 and/or the second robotic arm 22 to execute the deceleration action or stop action. As a result, the collision between the working first robotic arm 21 or the second robotic arm 22 and the object 9 may be avoided.

Specifically, the security sensing module 6 is configured to divide areas around the assembling system 1 within unequal distances into a dangerous area 81, a warning area 82 and a safety area 83 according to an arm information of the first robotic arm 21 and the second robotic arm 22. In some embodiments, the controlling unit 10 is configured to respectively control the first robotic arm 21 and the second robotic arm 22 to execute the deceleration action and the stop action in different levels when the object 9 enters the dangerous area 81, warning area 82 and safety area 83.

For example, when the object enters the safety area 83, the distance between the object 9 and the first robotic arm 21 or the second robotic arm 22 is still far enough. Thus, the controlling unit 10 may not control the first robotic arm 21 and the second robotic arm 22, or slightly decrease the moving speed of the first robotic arm 21 and the second robotic arm 22.

When the object 9 enters the warning area 82, the object 9 may have the possibility of colliding with the first robotic arm 21 or the second robotic arm 22. Thus, the controlling unit 10 may greatly decrease the moving speed of the first robotic arm 21 and the second robotic arm 22. When the object 9 enters the dangerous area 83, the object 9 may collide with the first robotic arm 21 or the second robotic arm 22 at any time. Thus, the controlling unit 10 may control the first robotic arm 21 and the second robotic arm 22 to stop moving instantaneously.

The aforementioned descriptions are some embodiments of the disclosure, here is not intended to be limiting.

As described above, the assembling system 1 of the disclosure may satisfy the demand of rapid changeover on the production line through the usage of at least two robotic arms 21, 22. Further, the assembling system 1 of the disclosure provides the graphic program editing page 31 for the manager, who is lacking programming ability, to edit the graphic program. Moreover, the assembling system 1 of the disclosure provides the point-teaching tool 23 on the robotic arms 21, 22 to allow the manager to intuitively perform the point-teaching for the robotic arms in a hand-pulled manner, thereby achieving the technical feature of convenient operation.

While this disclosure has been described by means of specific embodiments, numerous modifications and variations may be made thereto by those skilled in the art without departing from the scope and spirit of this disclosure set forth in the claims.

What is claimed is:

1. A dual-arm robot assembling system, applied on a production line, the system comprising:
   a controlling unit;
   a first robotic arm, communicatively connected with the controlling unit, and comprising a first tool disposed on one end thereof;
   a second robotic arm, communicatively connected with the controlling unit, and comprising a second tool disposed on one end thereof; and
   a graphic user interface, communicatively connected with the controlling unit and configured to provide a graphic program editing page, the graphic program editing page providing multiple instruction blocks, the instruction blocks configured to edit, based on at least one serial relationship and at least one parallel relationship, a graphic program executed when the controlling unit controls the first robotic arm and the second robotic arm to perform an assembling operation, wherein the instruction blocks respectively record an executable action of the first robotic arm or the second robotic arm, a corresponding position of each action, and handshaking information between the first robotic arm and the second robotic arm,
   wherein the serial relationship indicates that actions of multiple instruction blocks are executed one after another and the parallel relationship indicates that actions of multiple instruction blocks are executed simultaneously,
   wherein a point-teaching tool is disposed on at least one of the first robotic arm and the second robotic arm, and the point-teaching tool is configured to accept operation from external force to drag the first robotic arm or the second robotic arm to move and directly perform a point-teaching procedure,
   wherein the graphic program editing page comprises an action instruction area and a program editing area, the action instruction area is configured to provide the instruction blocks being pre-created, and the program editing area is configured to edit the graphic program according to the instruction blocks,
   wherein when a plurality of the instruction blocks is dragged from the action instruction area to the program editing area, the serial relationship and the parallel relationship are established with each other, and the program editing area is configured to generate the graphic program based on the plurality of the instruction blocks with the serial relationship and the parallel relationship.

2. The dual-arm robot assembling system according to claim 1, wherein the first tool comprises an assembling tool and the second tool comprises a gripping tool.

3. The dual-arm robot assembling system according to claim 1, wherein the point-teaching tool comprises a handle disposed on the first robotic arm or the second robotic arm, the handle comprises an initiating button, after the initiating button is being pressed, the handle drags the first robotic arm or the second robotic arm to move, and changes and records a position of the first robotic arm or the second robotic arm on an X-axis and a Y-axis in a planar space.

4. The dual-arm robot assembling system according to claim 3, wherein the point-teaching tool comprises a setting button disposed on the first robotic arm or the second robotic arm, the setting button is configured to control each pivot joint of the first robotic arm or the second robotic arm, and adjust the position of the first robotic arm or the second robotic arm in the planar space.

5. The dual-arm robot assembling system according to claim 1, wherein the controlling unit executes a simulation software, the simulation software simulates execution of the graphic program based on a present set value of the first robotic arm and the second robotic arm, records a cycle time of the graphic program, and analyzes an interfering condition of the first robotic arm and the second robotic arm when the graphic program is executed.

6. The dual-arm robot assembling system according to claim 5, wherein the simulation software is configured to display an interfering area with different colors on a display screen of the controlling unit, when the first robotic arm and the second robotic arm interfere with each other.

7. The dual-arm robot assembling system according to claim 1, wherein a security sensing module is disposed on the first robotic arm or the second robotic arm, when the controlling unit controls the first robotic arm and the second robotic arm to act and the security sensing module senses that an object approaches, the controlling unit is configured to control the first robotic arm and the second robotic arm to execute a deceleration action or a stop action.

8. The dual-arm robot assembling system according to claim 7, wherein the security sensing module is configured to divide areas around the dual-arm robot assembling system within unequal distances into a safety area, a warning area and a dangerous area according to an arm information of the first robotic arm and the second robotic arm, and the controlling unit is configured to respectively control the first robotic arm and the second robotic arm to execute the deceleration action and the stop action in different levels when the object enters the safety area, the warning area and the dangerous area.

9. The dual-arm robot assembling system according to claim 1, further comprising:
a 3D calibration platform, communicatively connected with the controlling unit, and configured to calibrate and synchronize a coordinate position of the first robotic arm and the second robotic arm.

10. A dual-arm robot assembling system, applied on a production line, the system comprising:
a controlling unit;
a first robotic arm, communicatively connected with the controlling unit, and comprising a first tool disposed on one end thereof;
a second robotic arm, communicatively connected with the controlling unit, and comprising a second tool disposed on one end thereof;
a graphic user interface, communicatively connected with the controlling unit and configured to provide a graphic program editing page, the graphic program editing page providing multiple instruction blocks, the instruction blocks configured to edit a graphic program executed when the controlling unit controls the first robotic arm and the second robotic arm to perform an assembling operation, wherein the instruction blocks are respectively corresponding to different control instructions and handshaking data used for controlling the first robotic arm and the second robotic arm; and
a vision controller, communicatively connected with the controlling unit, wherein the controlling unit is configured to control the vision controller to capture an image at required position and execute an image recognition procedure, and the graphic program editing page is configured to provide at least one of the instruction blocks corresponding to one or multiple instructions used for controlling the vision controller to execute an image capturing action;
wherein a point-teaching tool is disposed on at least one of the first robotic arm and the second robotic arm, and the point-teaching tool is configured to accept operation from external force to drag the first robotic arm or the second robotic arm to move and directly perform a point-teaching procedure;
wherein the graphic program editing page comprises an action instruction area and a program editing area, the action instruction area is configured to provide the instruction blocks being pre-created, and the program editing area is configured to edit the graphic program according to the instruction blocks,
wherein when a plurality of the instruction blocks is dragged from the action instruction area to the program editing area, the serial relationship and the parallel relationship are established with each other, and the program editing area is configured to generate the graphic program based on the plurality of the instruction blocks with the serial relationship and the parallel relationship.

11. The dual-arm robot assembling system according to claim 10, wherein the first tool comprises an assembling tool and the second tool comprises a gripping tool.

12. The dual-arm robot assembling system according to claim 10, wherein the graphic program editing page comprises an action instruction area and a program editing area, the action instruction area is configured to provide the instruction blocks being pre-created, and the program editing area is configured to edit the graphic program according to the instruction blocks.

13. The dual-arm robot assembling system according to claim 12, wherein when a plurality of the instruction blocks is dragged from the action instruction area to the program editing area, a serial relationship or a parallel relationship is established with each other, and the program editing area is configured to generate the graphic program based on the plurality of the instruction blocks with the serial relationship or the parallel relationship.

* * * * *